United States Patent [19]

Ambardanishvili et al.

[11] 4,259,280
[45] Mar. 31, 1981

[54] METHOD FOR PREPARING NEUTRON-ACTIVATION DETECTORS

[76] Inventors: Tristan S. Ambardanishvili, ulitsa Lenina, 2a, Gruzinskaya SSr, Mtskhetsky raion, poselok Zages; Vakhtang J. Dundua, ulitsa Buachidze, 25, Tbilisi; Gennady I. Kiknadze, prospekt V. Pshavela, VI kvartal, 31 korpus, kv. 19, Tbilisi; Mikhail A. Kolomiitsev, ulitsa Ozhio, 7, Tbilisi; Teya V. Tsetskhladze, ulitsa Pekina, 47, kv. 4, Tbilisi; Vladimir A. Gromov, ulitsa Dzhordzhqdze, 5, kv. 9, Tbilisi; Nanuli V. Bagdavadze, prospekt Vazha Pshavela, kvartal 4, korpus 21, kv. 1, Tbilisi, all of U.S.S.R.

[21] Appl. No.: 668,255

[22] Filed: Mar. 18, 1976

Related U.S. Application Data

[63] Continuation of Ser. No. 224,439, Feb. 8, 1972, abandoned.

[51] Int. Cl.³ .............................................. G01T 3/00
[52] U.S. Cl. .................................. 264/101; 250/473; 264/29.5; 264/63; 264/115; 264/236; 264/347

[58] Field of Search ............ 264/29.1, 29.5, 29.3, 264/115, 63, 60, 104, 105, 122, 140, 236, 347; 250/472, 473; 176/19, 19 R

[56] References Cited

U.S. PATENT DOCUMENTS

| | | | |
|---|---|---|---|
| 2,120,585 | 6/1938 | Weelands | 264/331 |
| 2,190,605 | 2/1940 | Moore | 264/331 |
| 3,197,527 | 7/1965 | Krummeich | 264/29.3 |
| 3,347,668 | 10/1967 | Clark et al. | 264/105 |
| 3,634,569 | 1/1972 | Emanuelson et al. | 264/105 |
| 3,718,720 | 2/1973 | Lambdin et al. | 264/29.5 |

FOREIGN PATENT DOCUMENTS

| | | |
|---|---|---|
| 1208829 | 1/1966 | Fed. Rep. of Germany . |
| 1464953 | 5/1969 | Fed. Rep. of Germany . |
| 1406529 | 6/1965 | France . |
| 1245917 | 9/1971 | United Kingdom . |

*Primary Examiner*—Jeffery R. Thurlow
*Attorney, Agent, or Firm*—Haseltine and Lake

[57] ABSTRACT

A detecting material capable of being activated by neutrons is mixed with a liquid polycondensation resin capable of thermal hardening. The obtained mixture is heated until the resin is transformed into a fusible product that is then cooled to room temperature. Thus hardened mixture is ground into powder suitable for pressing into tablets.

6 Claims, 3 Drawing Figures

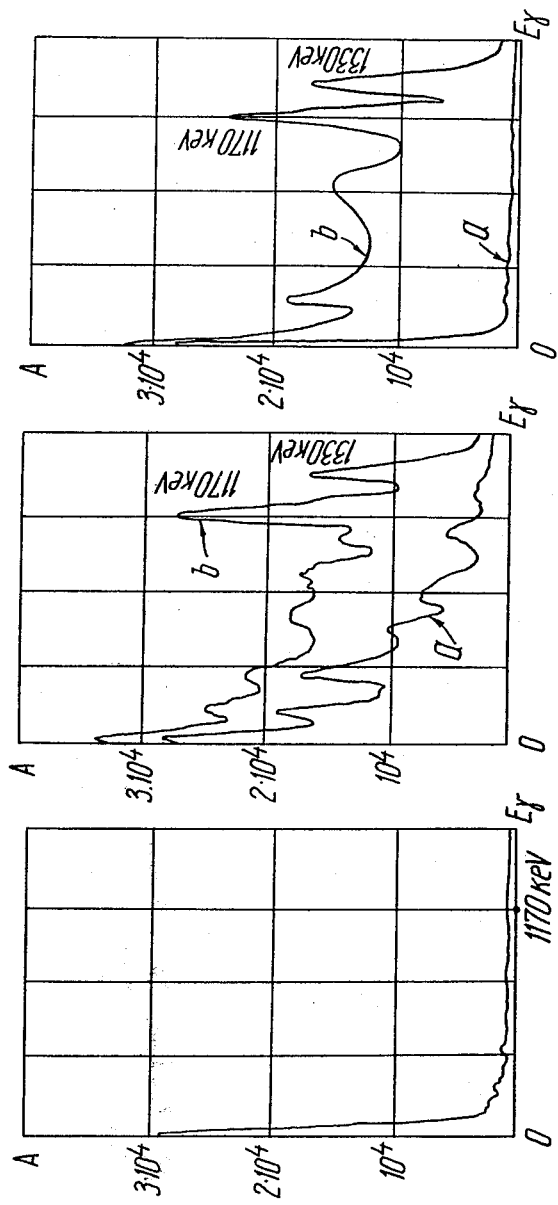

METHOD FOR PREPARING NEUTRON-ACTIVATION DETECTORS

This is a continuation of application Ser. No. 224,439 filed Feb. 8, 1972 now abandoned.

This invention relates to a method for preparing neutron-activation detectors, used for measuring integral neutron currents during irradiation of specimens, and for reconstruction of the neutron energy spectrum.

By the term neutron-activation detector is meant a detector containing a material capable of being activated by neutrons. The radioactivity of this detector after irradiation can be determined by the normal methods used for measuring ionizing particles. The thus obtained data can be used for calculation of the neutron current at the point where the detector was irradiated.

Known in the prior art are neutron-activation detectors comprising chemically pure elements as the neutron detector. These neutron-activation detectors are used in the form of foil, or films deposited onto an inert base inactive towards the action of neutrons, tablets, wire or alloys with an inert matrix.

The majority of these detectors have serious disadvantages that limit the field of their application.

Since foil itself is an element-detector, its mass cannot sometimes be diminished to the required magnitude, which in turn is determined by the magnitude of the integral current of neutrons. At the same time, if the mass of foil is increased to a significant extent, the measurement of high integral currents of neutrons becomes difficult due to the great induced activity. Moreover, fine foil is very often insufficiently strong mechanically. The difficulty arises also in selection of a suitable inert base material when the detecting element is used in the form of powder. Wires (similar to foil) are characterized by a considerable mass; furthermore, they do not quite suit the purpose because of inconstancy of their geometrical shapes. Alloys cannot fully meet the requirements either, firstly because of a considerable activation of the matrix material, and secondly due to the absence of standard methods for their preparation. All these disadvantages are inherent in tablets. Moreover, the tablets are often easily melted and have low mechanical strength. The difference in the physico-chemical properties of the detector materials are responsible for the difficulties in the manufacture of the neutron-activation detectors of the above described types. Rolling into fine foil, metal vacuum spraying onto an inert base, preparation of homogeneous alloys or wires, all these methods used for the manufacture of the above named detectors are specific for each particular element, and require also expensive equipment.

Known also is an neutron-activation detector comprising a detector material distributed in a matrix inert with respect to neutrons, for example in phenolformaldehyde resin. The difficulty resides here in the uniform distribution of the detector material in the bulk of the matrix.

The object of this invention is to work out a process for the preparation of neutron-activation detectors that would scarcely depend on the physico-chemical properties of the detector material, and would also ensure the manufacture of neutron detectors possessing high mechanical strength, thermal and radiation resistance, and containing any required small quantity of the detector material.

The object of the invention can be solved by a method that ensures even distribution of the detector material in the bulk of the matrix and also supplies the mechanical strength and thermal and radiation resistance required of the detectors.

The object has been attained by that the detector material is mixed with a liquid polycondensation resin capable of thermal hardening; partially hardening the prepared mixture hardened partly to the melting insoluble state with subsequent cooling of the mass (fusible product) to complete hardening; and grinding the completely hardened means into a powder suitable for pressing into tablets.

The advantage of the proposed method resides in the fact that uniform mixing of the detector material with a liquid polycondensation resin is ensured, together with an adequate adhesion of the detector particles to the resin which serves as a polymer bonding material. Grinding of the obtained mixture into powder after partial hardening to the fusible product obviates the dependence of the process for the manufacture of neutron detectors on the physico-chemical properties of the detector material, and moreover, it improves the uniformity of the detector material distribution in the bulk of the matrix that is in the resin. Pressing of the powdered mixture into tablets ensures quick preparation of a large number of neutron detectors and does not require expensive equipment.

For a better mixing of the detector material with the polycondensation resin, an alcohol-soluble compound of the detector material is employed, which is dissolved in alcohol and the solution is then mixed with an alcoholic solution of a liquid polycondensation resin until a homogeneous mixture is obtained. Next the alcohol is removed from the mixture by distillation.

This method ensures homogeneous distribution of the detector material in the bulk of the matrix, since the detector material and the liquid polycondensation resin are present in the alcoholic solutions in the form of molecular dispersions. Furthermore, since the components are mixed in the solution form, practically any small quantity of the detector material can be introduced into the mixture in the form of a dilute solution in alcohol, which ensures the homogeneous distribution of the detector material in the bulk of the matrix, the concentration being as small as $10^{-10}$ to $10^{-12}$ g/g of the matrix.

In order to improve the radiation resistance of the detectors on the basis of polycondensation resins, a finely dispersed carbon filler is introduced into the mixture before distillation of the alcohol therefrom.

This improves the radiation resistance of the activation detectors owing to an easier glow-out of the excitation energy of polycondensation resin fragments during contact with the radiation-resistant particles of carbon.

In order to supply the required mechanical strength to the pressed detectors, they are slowly heated until they are converted into a non-melting insoluble state.

This method ensures the high mechanical strength and thermal resistance (300° C.) of the tabletted detectors achieved by reason of the spatial union of separate fragments of the polycondensation resin into a rigid spatial lattice. Moreover, hardening of the polycondensation resin to the non-melting insoluble state allows one to obtain detectors that can be easily cleaned from superficial impurities owing to the vitreous structure of the matrix.

In order to increase the thermal and radiation resistance of the detectors containing high-melting detector materials, the completely hardened non-melting insoluble tablets are subjected to pyrolysis at a temperature above 300°-400° C. but below the boiling point of the detector material.

In this case the neutron-activation detectors acquire the high radiation and thermal resistance desired. This is ensured by removal of hydrogen and oxygen from the matrix and by its carbonization and aromatization accompanied by crystallization of the carbon residue and graphitization of its structure.

The invention will now be illustrated by examples with reference to the accompanying drawings in which:

FIG. 1 shows graphically the $\gamma$-spectrum of irradiated phenolformaldehyde resin where the decay activity is plotted against the ordinate or y axis (in minutes per gram), whereas the energy of $\gamma$-quanta is plotted against the absicca or X axis;

FIG. 2 shows the $\gamma$-spectrum of the pyrolysed graphite (curve a) and the cobalt detector filled with this graphite (curve b), the detector being manufactured on the basis of phenolformaldehyde resin, where the decay activity is plotted as the ordinate (in minutes per gram) and the energy of the $\gamma$-quanta as the abscissa;

FIG. 3 shows the $\gamma$-spectrum of carbonized phenolformaldehyde resin (curve a) and the cobalt detector (curve b) on the basis of this resin.

EXAMPLE 1

The detector material is ground in an agate mortar, and the powder is added into a liquid polycondensation resin contained in a quartz cup. The components are mixed with a glass rod or a spatula until a homogeneous mixture is obtained, which is then hardened by heating to the molten insoluble state. The mass is then cooled and the hardened material is ground into a powder. This powder is pressed into tablets which are neutron detectors.

The polycondensation resin is a pure (with respect to the activation) phenolformaldehyde resin having a molecular weight of about 500 and containing about 14 percent phenol hydroxyls and about 11 percent methylol hydroxyls.

The required purity of the resin depends on the selected detector material and is characterized by the presence of durable admixtures which interfere with isolation of the required $\gamma$-line of the spectrum during work with the detector after its irradiation. The detecting material may be sulphur, phosphorus, nitrates of cobalt, nickel, zinc or iron and any other materials used ordinarily as detectors. If phenolformaldehyde resin is used, it hardening to the molten insoluble state is carried out in a thermostat at a temperature of about 70° C. for 20-24 hours. The mixture is then cooled to room temperature, ground into powder and pressed into tablets at a pressure from 200 to 2000 kg/sq.cm. Thus-prepared detectors can operate at a temperature of 60°-80° C. The detecting material content of the tablets is given in Table 1.

TABLE 1

Detecting element content of tablets prepared in a single batch in the process described in Example 1.

| Detector element | Detector element content of various tablets, mg/g of matrix Tablets | | | | | | Mean value mg/g | Deviation from mean value, % |
|---|---|---|---|---|---|---|---|---|
|  | 1 | 2 | 3 | 4 | 5 | 6 |  |  |
| Cobalt | 0.51 | 0.55 | 0.47 | 0.53 | 0.49 | 0.54 | 0.52 | 5 |
| Zinc | 10.2 | 9.5 | 9.8 | 10.5 | 9.4 | 10.3 | 9.8 | 4 |
| Phosphorus | 12.1 | 11.5 | 13.0 | 11.0 | 11.7 | 12.6 | 12.0 | 5 |
| Iron | 3.30 | 3.21 | 3.45 | 3.51 | 3.27 | 3.36 | 3.55 | 3 |
| Gold | 0.051 | 0.056 | 0.063 | 0.061 | 0.053 | 0.053 | 0.057 | 7 |
| Indium | 0.121 | 0.110 | 0.115 | 0.107 | 0.123 | 0.126 | 0.117 | 5 |

EXAMPLE 2

The procedure for preparation of the detectors is the same as described in Example 1, except that a mixture containing 70-90 percent of the resin as in Example 1, and 30-10 percent of phenolformaldehyde novolac resin is used as the polycondensation resin.

EXAMPLE 3

The detecting materials are either nitrates or acetates partially dehydrated in vacuum of about 1 mm Hg at a temperature of 80°-100° C. for 3-5 hours. Alcoholic solutions are prepared from these salts. The alcoholic solutions of the detecting materials are introduced into a 50 percent alcoholic solution of phenolformaldehyde resin. The mixture is placed into a suitable apparatus used for vacuum distillation of solvents, and the alcohol is removed from the mixture. During this process the mixture becomes uniform throughout its entire bulk with respect to density and thereby becomes homogeneous. The distillation of the alcohol is carried out on a water bath, first at a temperature of 60° C., and then the temperature is increased so that, at the end of the distillation process, it is 90° C. At this temperature, the mixture is retained for 15-20 minutes. The further process for preparation of detectors is described in Example 1. The detectors prepared by mixing the alcoholic solutions are characterized by a molecular dispersion of the detecting material in the bulk of the matrix, in other words, true homogeneity is provided.

TABLE 2

Detecting element content of tablets prepared in Example 3 a single batch in the process described in

| Detector element Nos. of tablets | Detector element content of tablet (dimensionless units) | | | | | | Mean value | Deviation from mean value, % |
|---|---|---|---|---|---|---|---|---|
|  | 1 | 2 | 3 | 4 | 5 | 6 |  |  |
| Cobalt (0.50 mg/g) | 100.0 | 100.1 | 100.1 | 100.3 | 100.1 | 100.2 | 100.1 | 0.1 |
| Zinc | 100.0 | 100.0 | 100.3 | 100.2 | 100.2 | 100.1 | 100.1 | 0.1 |
| Phosphorus (12 mg/g) | 100.0 | 100.2 | 100.2 | 100.3 | 100.3 | 100.2 | 100.2 | 0.2 |
| Iron (3.5 mg/g) | 100.0 | 100.0 | 100.1 | 100.2 | 100.1 | 100.1 | 100.1 | 0.1 |
| Gold (0.05 mg/g) | 100.0 | 100.1 | 100.1 | 100.1 | 100.3 | 100.1 | 100.1 | 0.1 |
| Indium |  |  |  |  |  |  |  |  |

TABLE 2-continued

Detecting element content of tablets prepared in Example 3 a single batch in the process described in

| Detector element Nos. of tablets | Detector element content of tablet (dimensionless units) | | | | | | Mean value | Deviation from mean value, % |
|---|---|---|---|---|---|---|---|---|
| | 1 | 2 | 3 | 4 | 5 | 6 | | |
| (0.1 mg/g) | 100.0 | 100.3 | 100.0 | 100.1 | 100.3 | 100.0 | 100.1 | 0.1 |

EXAMPLE 4

Mixtures of detecting material with polycondensation resins are prepared by either of the methods described in Examples 1, 2 or 3. The mixture is placed into a quartz cup for evaporation and kept in vacuum of about 50 mm Hg at a temperature of about 80° C. for two hours by which the mixture is transformed into a molten insoluble state. The vacuum treatment accelerates the hardening process; and, moreover, a porous mass, that can easily be disintegrated into powder, is obtained as a result.

This method has been tested with polycondensation resins described in Examples 1 and 2. The detecting materials were nitrates of metals listed in Example 3. The method ensures homogeneity of the detecting material distribution at the level speciifed in Table 2.

EXAMPLE 5

During the manufacture of the detectors according to the procedure described in Example 1, the detecting material and a powder of thoroughly disintegrated carbonaceous filler, for example pyrolyzed graphite, were introduced into a liquid polycondensation resin. When detectors were manufactured by the process described in Example 3, the powdered carbonaceous filler was introduced into the mixture before distillation of the alcohol. The particle size of the powder should be less than 5 millimicron. The radiation resistance of the detector in this case increases, while there is no practical deviation from homogeneity of the detecting material distribution in the bulk (below the sensitivity of the determination). However, the $\gamma$-spectrum (FIG. 2) of the obtained detectors is impaired due to the presence of impurities in graphite.

EXAMPLE 6

Pure (with respect to activation) phenolformaldehyde resin is preliminarily heated to the non-molten insoluble state and then pyrolyzed in a vacuum or in a current of argon at a temperature of 1800°-2800° C. on a graphite base for 3-5 hours. The carbonaceous material is disintegrated to 5 millimicron particle size and used instead of pyrolyzed graphite as described in Example 5. The $\gamma$-spectrum (FIG. 3) of this carbonaceous material is characterized by special purity, owing to which the $\gamma$-spectrum of the activation detector filled with this material does not differ from the $\gamma$-spectrum of a pure detecting element. With the particle size of the carbonaceous filler reduced below 5 millimicron, the homogeneity of the detecting element distribution does not differ from the data given in Tables 1 and 2 respectively (depending on whether a liquid resin and a powdered detecting material or their solutions in alcohol are used).

EXAMPLE 7

Detectors in the form of tablets, prepared by the procedure described in Examples 1 through 6, are placed in a thermostat and kept there for 24 hours at a temperature of 80° C., then the temperature is increased to 100° C. and the heat treatment is continued for another 24 hours. Then the temperature is elevated to 120°-140° C. and maintained at this level for 5-6 hours. As a result the tablets are transferred into the non-molten insoluble state and acquire high mechanical strength and thermal resistance (to about 300° C.) The radiation resistance of these tablets with respect to the integral current of neutrons in the division spectrum is not below $10^{19}$ n/sq.cm, and even $10^{20}$ n/sq.cm, if carbon is added as described in Examples 5 and 6.

EXAMPLE 8

A detector prepared by any method as described in Examples 1 through 4 is heated again until the resin is transformed into a non-molten insoluble product known as resite (see Example 7). Next, the tablet is placed into an inert medium (vacuum or a current of argon) at a temperature of 400° C. and maintained at this temperature for three hours; then the temperature is increased to that not exceeding the boiling point of the detecting material. With high temperature treatment, the detectors retain their geometrical shapes and this high mechanical strength; however they become carbonized and their structure is changed. During this treatment they acquire high radiation resistance of about $10^{21}$ n/sq.cm. The finished detectors can operate at temperatures above that at which they were annealed (Table 3). The spectra of these detectors coincide with those of pure element-detectors.

TABLE 3

Detecting element content of annealed tablets in a single batch

| Detector element | Annealing temperature °C. | Element content of tablet mg/g of matrix Tablet Nos. | | | | | Deviation from mean value, % |
|---|---|---|---|---|---|---|---|
| | | 1 | 2 | 3 | 4 | 5 | |
| Cobalt | 1800 | 1.21 | 1.22 | 1.22 | 1.20 | 1.21 | 0.5 |
| Nickel | 2300 | 5.81 | 5.90 | 5.92 | 5.86 | 5.88 | 0.5 |
| Zinc | 1200 | 17.2 | 17.0 | 17.0 | 17.3 | 17.3 | 0.7 |
| Aluminium | 1000 | 20.1 | 20.0 | 20.4 | 20.0 | 20.2 | 0.5 |

The proposed method can be used for the manufacture of detectors containing the minimum required quantities of the detecting material (as little as $10^{-12}$ g/detector); it allows also significant widening of the range of their application owing to the high mechanical strength, and radiation and thermal resistance.

What we claim is:

1. A method for producing an activation detector of neutrons, comprising an element-detector material capable of being activated by neutrons and distributed in a bulk of a matrix incapable of being activated by neutrons, comprising the steps of:
   (a) dissolving a polycondensation resin capable of being heat solidified in a liquid solvent to produce a solution;
   (b) introducing said element-detector material into said solution in a ratio of $10^{-12}$ to $1.3 \cdot 10^{-2}$ g per 1 g of the resin to produce a mixture;

(c) heating said mixture at a temperature of 60°-80° C. during 20-24 hours;
(d) cooling thereafter said mixture to room temperature to produce a solidified mixture;
(e) grinding said solidified mixture into a powder; '(f) pressing said powder into tablets under a pressure of 200-2000 kg/cm$^2$, said tablets being detectors.

2. A method as defined in claim 1, wherein alcohol solutions of the polycondensation resin and the element-detector material are mixed.

3. A method as defined in claim 1, wherein said mixture is heated at a temperature of 80° C. in vacuum of near 50 mm of Hg.

4. A method as defined in claim 2, wherein a carbon powder pure with respect to activation and having particles of not less 5 m$\mu$ is introduced into the liquid mixture of the polycondensation resin and the element-detector material.

5. A method as defined in claim 4, wherein a carbon produced by pyrolysis and carbonization of a resite pure with respect to activation at a temperature of 1800°-2800° C. is introduced into said mixture.

6. A method as defined in claim 1, wherein said pressed tablets are continuously heated up to a temperature at which said resin is converted into an infusible insoluble product.

* * * * *